United States Patent
Kumagai

(10) Patent No.: US 9,376,553 B2
(45) Date of Patent: Jun. 28, 2016

(54) ORGANIC-INORGANIC COMPOSITE MOLDED PRODUCT AND OPTICAL ELEMENT

(75) Inventor: Takeaki Kumagai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/126,406

(22) PCT Filed: May 28, 2012

(86) PCT No.: PCT/JP2012/003455
§ 371 (c)(1),
(2), (4) Date: Dec. 13, 2013

(87) PCT Pub. No.: WO2012/172736
PCT Pub. Date: Dec. 20, 2012

(65) Prior Publication Data
US 2014/0142229 A1  May 22, 2014

(30) Foreign Application Priority Data

Jun. 15, 2011 (JP) .................. 2011-133498
Jun. 15, 2011 (JP) .................. 2011-133499
Jun. 15, 2011 (JP) .................. 2011-133500

(51) Int. Cl.
*C08K 3/36* (2006.01)
*B29C 43/00* (2006.01)
(Continued)

(52) U.S. Cl.
CPC ............ *C08K 9/04* (2013.01); *B29C 43/003* (2013.01); *C08K 3/0033* (2013.01); *C08K 3/36* (2013.01)

(58) Field of Classification Search
CPC ... C08K 3/36; C08K 2003/2213; C08L 33/12
USPC .................................. 524/430, 560
See application file for complete search history.

(56) References Cited

U.S. PATENT DOCUMENTS

| | | | | |
|---|---|---|---|---|
| 2,467,341 A | * | 4/1949 | Seymour | C08K 3/36 524/560 |
| 2005/0027040 A1 | * | 2/2005 | Nelson et al. | 523/216 |
| 2007/0147767 A1 | * | 6/2007 | Nonaka et al. | 385/142 |

FOREIGN PATENT DOCUMENTS

| | | |
|---|---|---|
| JP | H11-343349 A | 12/1999 |
| JP | 2001172048 A | 6/2001 |
| JP | 2003281942 A | 10/2003 |

(Continued)

OTHER PUBLICATIONS

Hillmer et al. Risk, Reliability and Societal Safety—Aven & Vinnem (eds) © 2007 Taylor & Francis Group, London, ISBN 978-0-415-44786-7, pp. 377-383.*

(Continued)

*Primary Examiner* — Vu A Nguyen
(74) *Attorney, Agent, or Firm* — Canon USA, Inc. I.P. Division

(57) ABSTRACT

A mixed material which includes a poly(methyl methacrylate) and inorganic fine particles which are surface-treated with a functional group having an amino group or a hexadecyl group or inorganic fine particles having hydrophilic surfaces and in which the content of the inorganic fine particles is 30 to 80 vol % is molded into an organic-inorganic composite molded product, and hence, a low coefficient of linear expansion in a range of 20 to 60 degrees Celsius, such as $20*10^{-6}/$ degree Celsius or less, is realized.

12 Claims, 3 Drawing Sheets

(51) Int. Cl.
*C08K 9/04* (2006.01)
*C08K 3/00* (2006.01)

(56) References Cited

FOREIGN PATENT DOCUMENTS

| JP | 2004-099865 A | 4/2004 |
| JP | 2004-224882 A | 8/2004 |
| JP | 2006160779 A | 6/2006 |
| JP | 2006291197 A | 10/2006 |
| JP | 2007-126636 A | 5/2007 |

OTHER PUBLICATIONS

Cai et al. Electronics Letters, 2008, 44(16), 2 pages.*
Machine translation of JP2000-044811 A.*

* cited by examiner

ORGANIC-INORGANIC COMPOSITE MOLDED PRODUCT AND OPTICAL ELEMENT

TECHNICAL FIELD

The present invention relates to an organic-inorganic composite molded product having a low coefficient of linear expansion and an optical element.

BACKGROUND ART

In general, although substances are expanded by heating, it has been known that the coefficient of linear expansion of an organic resin material is particularly high. For example, in a device represented by a device used for a precision optical system, in the case in which a member formed from an organic resin material is used, when the coefficient of linear expansion thereof is high, and the change in dimension of the member is large due to the change in temperature, the optical system may be disadvantageously displaced thereby. When a member used for a precision optical system is formed only from an organic resin material, the coefficient of linear expansion thereof is desired to be $20*10^{-6}$/degree Celsius or less.

In PTL 1 and PTL 2, as a method to prevent the displacement of an optical system caused by the thermal expansion of an organic resin material, a method has been disclosed in which a material having a negative linear expansion (hereinafter referred to as "negative expansion") property is provided around a member formed of the organic resin material to compensate for the change in dimension.

In addition, in PTL 3 and PTL 4, as a method to prevent the displacement of an optical system caused by the thermal expansion of an organic resin material, a method has been disclosed in which inorganic fine particles are added to the organic resin material to decrease the coefficient of linear expansion.

In general, as a material having a negative expansion property, for example, inorganic materials, such as zirconium tungstate, a lithium-aluminum-silicon oxide, and a nitride of manganese, have been known.

However, in the already known method in which inorganic fine particles are added to an organic resin material to decrease the coefficient of linear expansion, a molded product having a coefficient of linear expansion of $10*10^{-6}$/degree Celsius or less is difficult to obtain, and hence the above method is difficult to be applied to a precision optical system and the like.

In addition, when the expansion of an organic resin material is compensated for by a negative expansion material of a manganese nitride, the absolute value of the coefficient of linear expansion of the inorganic material having a negative expansion property is small, such as $25*10^{-6}$/degree Celsius, at the maximum. As in the case described above, the absolute value of the coefficient of linear expansion of an organic material having a negative expansion property is also small, such as less than $10*10^{-6}$/degree Celsius. Therefore, in order to compensate for the expansion of an organic resin material caused by the change in temperature, a molded product formed using a material having a negative expansion property must have a considerable thickness or mass.

CITATION LIST

Patent Literature

PTL 1: Japanese Patent Laid-Open No. 2001-172048
PTL 2: Japanese Patent Laid-Open No. 2003-281942
PTL 3: Japanese Patent Laid-Open No. 2006-291197
PTL 4: Japanese Patent Laid-Open No. 2006-160779

SUMMARY OF INVENTION

The present invention was made in consideration of the background art as described above and provides an organic-inorganic composite material, an organic-inorganic composite molded product having a low coefficient of linear expansion, and an optical element.

An organic-inorganic composite molded product which solves the above problems is an organic-inorganic composite molded product formed by molding a mixed material which includes a poly(methyl methacrylate) and inorganic fine particles surface-modified with a functional group at least having an amino group and in which the content of the inorganic fine particles is 30 to 80 vol %, and a coefficient of linear expansion of the organic-inorganic composite molded product in a range of 20 to 60 degrees Celsius is $10*10^{-6}$/degree Celsius or less (however, a negative coefficient of linear expansion is included).

A thermoplastic composite material which solves the above problems includes a poly(methyl methacrylate) and inorganic fine particles surface-modified with a functional group at least having a hexadecyl group, and the content of the inorganic fine particles is 30 to 80 vol %.

A molded product which solves the above problems is a molded product formed by molding the above thermoplastic composite material, and a coefficient of linear expansion of the molded product in a range of 20 to 60 degrees Celsius is $20*10^{-6}$/degree Celsius or less (however, a negative coefficient of linear expansion is included).

An organic-inorganic composite material which solves the above problems includes a poly(methyl methacrylate) and inorganic fine particles having hydrophilic surfaces and an average primary particle diameter of 1 to 15 nm, and the content of the inorganic fine particles is 35 to 80 vol %.

An organic-inorganic composite molded product which solves the above problems is an organic-inorganic composite molded product formed by molding the above organic-inorganic composite material, and a coefficient of linear expansion of the organic-inorganic composite molded product in a range of 20 to 60 degrees Celsius is $20*10^{-6}$/degree Celsius or less (however, a negative coefficient of linear expansion is included).

Further features of the present invention will become apparent from the following description of exemplary embodiments with reference to the attached drawings.

DESCRIPTION OF EMBODIMENTS

Figure 1:
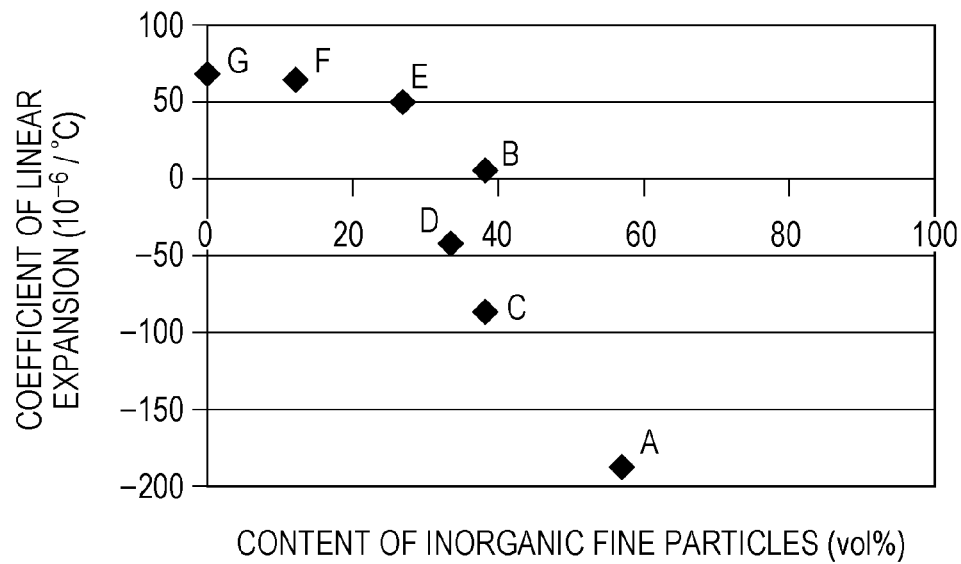
FIG. 1 is a graph showing the relationship between the content of inorganic fine particles and the coefficient of linear expansion of an organic-inorganic composite molded product obtained in a first embodiment.

Hereinafter, embodiments of the present invention will be described in detail.

First Embodiment

An organic-inorganic composite molded product according to the present invention is an organic-inorganic composite molded product formed by molding a mixed material which includes a poly(methyl methacrylate) and inorganic fine particles surface-modified with a functional group at least having an amino group and in which the content of the inorganic fine particles is 30 to 80 vol %. A coefficient of linear expansion of this organic-inorganic composite molded product in a range of 20 to 60 degrees Celsius is $10*10^{-6}$/degree Celsius or less (however, a negative coefficient of linear expansion is included).

In the present invention, molding is performed after inorganic fine particles surface-modified with a functional group having an amino group are mixed with a poly(methyl methacrylate) (hereinafter referred to as "PMMA"), so that an organic-inorganic composite molded product having a low coefficient of linear expansion is provided.

Inorganic Fine Particles 1

As the inorganic fine particles of the present invention, inorganic fine particles surface-modified with a functional group having an amino group are used. Heretofore, although a method has been well known in which the coefficient of linear expansion of an organic resin material is decreased by addition of inorganic fine particles thereto, the decrease in coefficient of linear expansion was not satisfactory. In the present invention, in order to significantly decrease the coefficient of linear expansion, inorganic fine particles surface-modified with a functional group having an amino group are selected for the use.

As the functional group having an amino group, for example, although 4-aminobutyl group, an N-(2-aminoethyl)-3-aminopropyl group, an N-(2-aminoethyl)-11-aminoundecyl group, an N-(6-aminohexyl)aminopropyl group, an N-phenyl-3-aminopropyl group, an (aminoethyl aminomethyl)phenethyl group, a 3-(m-aminophenoxy)propyl group, a m-aminophenyl group, a p-aminophenyl group, a 3-aminopropyl group, a 3-dimethylaminopropyl group, an N,N-dimethylaminopropyl group, an N-methylaminopropyl group, and an ureido propyl group may be mentioned, the functional group is not limited thereto.

Although the inorganic fine particles are not particularly limited, for example, metal oxide particles, such as silica, titania, zirconia, alumina, niobium oxide, magnesium oxide, beryllium oxide, tellurium oxide, yttrium oxide, and indium tin oxide, and metal particles, such as gold, platinum, and silver, may be mentioned. In particular, the inorganic fine particles are preferably silica fine particles.

Although the particle diameter of the inorganic fine particles is not particularly limited, the average primary particle diameter is 1 to 30 nm and preferably 7 to 12 nm. When the particle diameter is more than 30 nm, a low linear expansion property may be lost as the surface area of the inorganic fine particles is decreased.

As the inorganic fine particles surface-modified with a functional group having an amino group, commercial products, such as RA200H (silica, manufactured by Nippon Aerosil Co., Ltd.) and NA50H (silica, manufactured by Nippon Aerosil Co., Ltd.), may be used.

The organic-inorganic composite molded product of the present invention is an organic-inorganic composite molded product formed by molding a mixed material which includes a poly(methyl methacrylate) and the inorganic fine particles surface-modified with a functional group having an amino group.

The content of the inorganic fine particles included in the organic-inorganic composite molded product of the present invention is 30 to 80 vol % (percent by volume) and preferably 30 to 50 vol % (percent by volume). In this case, 30 vol % (percent by volume) approximately corresponds to 42 percent by weight. If the content of the inorganic fine particles is 30 vol % or more, the coefficient of linear expansion of the organic-inorganic composite molded product is considerably decreased. In order to reliably decrease the coefficient of linear expansion, although an increase of the content of the inorganic fine particles is effective, the organic-inorganic composite molded product becomes fragile and the moldability is degraded as the content is increased, and hence the content is preferably 80 vol % or less.

In addition, even if the content of one organic-inorganic composite molded product is the same as that of the other one, depending on the dispersion state of the inorganic fine particles, the coefficient of linear expansion may be different from each other in some cases. The content of the inorganic fine particles of the present invention indicates a value obtained by volume conversion of a residual weight percentage which is measured by increasing the temperature of the organic-inorganic composite molded product to 800 degrees Celsius using a thermogravimetric analysis (TGA) device.

The organic-inorganic composite molded product of the present invention has a coefficient of linear expansion in a range of 20 to 60 degrees Celsius of $10*10^{-6}$/degree Celsius or less (however, a negative coefficient of linear expansion is included). The coefficient of linear expansion of the organic-inorganic composite molded product of the present invention is preferably $-10*10^{-6}$ to $10*10^{-6}$/degree Celsius and more preferably $-5*10^{-6}$ to $5*10^{-6}$/degree Celsius. In this case, – indicates a negative coefficient of linear expansion. If the coefficient of linear expansion is more than $10*10^{-6}$/degree Celsius, since the change in dimension of the organic-inorganic composite molded product is increased by the change in temperature, and a member may be unfavorably displaced in some cases. The coefficient of linear expansion of the organic-inorganic composite molded product of the present invention in a range of 20 to 60 degrees Celsius is preferably a negative coefficient of linear expansion.

Organic-Inorganic Composite Molded Product 1

Next, a method for manufacturing an organic-inorganic composite molded product according to the present invention will be described.

The method for manufacturing an organic-inorganic composite molded product according to the present invention includes a step of forming a mixed material by mixing a poly(methyl methacrylate) and inorganic fine particles surface-modified with a functional group at least having an amino group so that the content of the inorganic fine particles is 30 to 80 vol %, and a step of performing pressure molding of the mixed material under heating condition.

The step of forming a mixed material is preferably performed in such a way that after the PMMA dissolved in a solvent is mixed with the inorganic fine particles or the inorganic fine particles dispersed in a solvent, the solvent is removed to obtain the mixed material.

The mixing of the PMMA and the inorganic fine particles is performed by a method in which after the PMMA is dissolved in a solvent and is then mixed with the fine particles, the solvent is removed.

As the solvent in which the PMMA is dissolved, for example, acetone, toluene, tetrahydrofuran, ethyl acetate, butyl acetate, xylene, and dimethylformamide may be mentioned. Since a residual solvent may adversely increase the coefficient of linear expansion, the solvent has to be reliably removed by heating and/or under reduced pressure. Therefore, in consideration of the removal of the solvent, a solvent having a relatively low boiling point, such as acetone, tetrahydrofuran, or ethyl acetate, is preferable.

The inorganic fine particles may be directly mixed with a solution of the PMMA, or a liquid prepared beforehand by mixing a solvent and the inorganic fine particles may be mixed with the PMMA solution. Since the volume of the solvent is not particularly limited, the solvent may be additionally added, if needed, as long as it can be finally removed. After the PMMA and the inorganic fine particles are mixed together, a mixed liquid thus prepared is preferably homogenized by using a homogenizer, an ultrasonic treatment, or the like.

The PMMA and the inorganic fine particles are mixed together so that the content of the inorganic fine particles is 30 to 80 vol %.

A material obtained by mixing an organic resin and inorganic fine particles can be molded by a known method, such as injection molding or heat press molding. In particular, the organic-inorganic composite material charged in a molding die can be molded into any shape by pressure application and heating at the glass transition temperature or more. When the temperature in molding is too low, a target shape cannot be transferred, and when the temperature is too high, the coefficient of linear expansion tends to be adversely increased; hence, the temperature is preferably in a range of 150 to 300 degrees Celsius. Although the molding pressure is not particularly limited, in order to transfer the shape of the molding die, the pressure is preferably 50 MPa or more. In addition, as the shape of the molded product, various forms, such as a sphere, a rod, a plate, a block, a tube, a spindle, a fiber, a grid, a film, and a sheet, can be molded and can be used as interior/exterior components used for various precision apparatuses and optical elements. In addition, since having a low coefficient of linear expansion in a range of 20 to 60 degrees Celsius, the organic-inorganic composite molded product according to the present invention can be used as a low-expansion member and a temperature compensating member, each of which is used for a precision optical device such as an optical fiber or a lens.

Figure 4A:
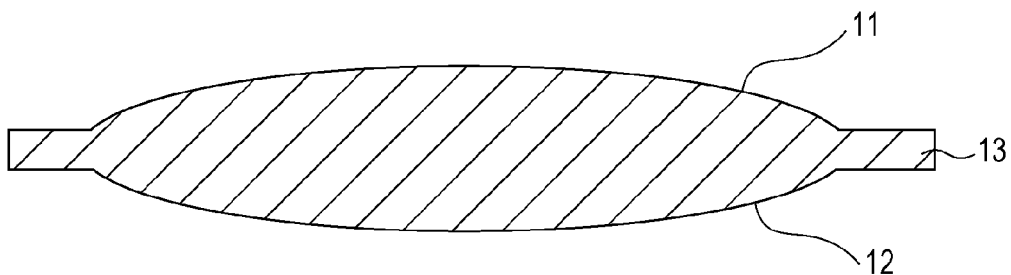
FIG. 4A is a cross-sectional view of an optical element formed from an organic-inorganic composite molded product.
Figure 4B:
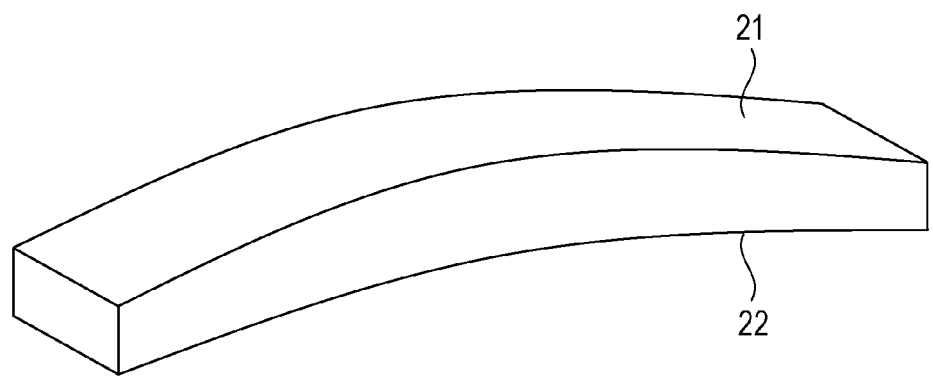
FIG. 4B is a perspective view of an optical element formed from an organic-inorganic composite molded product.
Figure 4C:
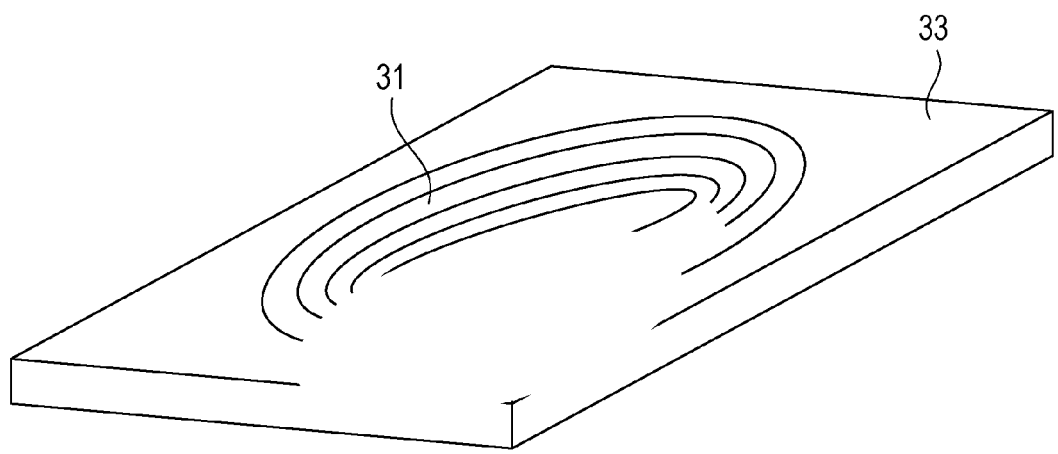
FIG. 4C is a perspective view of an optical element formed from an organic-inorganic composite molded product.

For example, the molded product may be used, for example, for an axisymmetric lens, such as an EF lens, shown in FIG. 4A which transmits light and which is used for a camera, video, or the like, a toric lens shown in FIG. 4B, or a reflective mirror which reflects light shown in FIG. 4C. FIG. 4A shows a cross-section of the lens in which reference numeral 11 indicates a first optical surface, reference numeral 12 indicates a second optical surface, and reference numeral 13 indicates a holding portion. FIG. 4B is a perspective view of the toric lens in which reference numeral 21 indicates a first optical surface, and reference numeral 22 indicates a second optical surface. FIG. 4C is a perspective view of the reflective mirror in which reference numeral 31 indicates a first mirror surface, and reference numeral 33 indicates a holding portion.

Examples

Example 1

Mixing of PMMA and Inorganic Fine Particles

A PMMA resin (Delpet 70NH, manufactured by Asahi Kasei Chemicals Corporation) was mixed with acetone to have a concentration of 5 wt % and was dissolved therein at ordinary temperature (25 degrees Celsius) by an ultrasonic treatment, so that a PMMA/acetone solution was prepared.

As the inorganic fine particles having an amino group, RA200H (silica, average primary particle diameter of 12 nm, manufactured by Nippon Aerosil Co., Ltd.) was mixed with acetone to have a concentration of 2.5 wt %, so that a (inorganic fine particles/acetone) liquid was prepared.

To 10 g of the PMMA/acetone solution thus prepared, 20 g of the (inorganic fine particles/acetone) liquid was dripped, and mixing was sufficiently performed using an ultrasonic treatment device. After the acetone in a mixed liquid was spontaneously dried to some extent, the solvent was removed at approximately 210 degrees Celsius for approximately 4 hours in a vacuum furnace, so that a (PMMA/inorganic fine particles) mixed material was obtained.

Molding

Molding was performed using a heat press method. As a release agent, Novec-1720 (manufactured by Sumitomo 3M Limited) was dripped on a surface of a press molding die having a diameter of 15 mm and was then sufficiently wiped off. The (PMMA/inorganic fine particles) mixed material was charged in the press molding die, and while the die was set in a compact heat press machine (manufactured by As One Corporation), the temperature was increased to 250 degrees Celsius. After the temperatures of an upper surface and a lower surface of the compact heat press machine reached 250 degrees Celsius, a load of 110 MPa was applied and was spontaneously released while cooling by wind was performed to 100 degrees Celsius. The load was completely released at 100 degrees Celsius, and the (PMMA/inorganic fine particles) mixed material was recovered from the die, so that an organic-inorganic composite molded product having a coin shape was obtained.

Example 2

An organic-inorganic composite molded product was obtained in a manner similar to that in Example 1 except that the (inorganic fine particles/acetone) liquid was adjusted to have a concentration of 5 wt %, and that 10.6 g of the (inorganic fine particles/acetone) liquid was added to 9.4 g of the PMMA/acetone solution.

Example 3

An organic-inorganic composite molded product was obtained in a manner similar to that in Example 1 except that when the (PMMA/inorganic fine particles) mixed material was formed, 17 g of the (inorganic fine particles/acetone) liquid having a concentration of 2.5 wt % was dripped.

Example 4

An organic-inorganic composite molded product was obtained in a manner similar to that in Example 1 except that when the (PMMA/inorganic fine particles) mixed material was formed, 14 g of the (inorganic fine particles/acetone) liquid having a concentration of 2.5 wt % was dripped.

Comparative Example 1

An organic-inorganic composite molded product was obtained in a manner similar to that in Example 1 except that when the (PMMA/inorganic fine particles) mixed material was formed, 10 g of the (inorganic fine particles/acetone) liquid having a concentration of 2.5 wt % was dripped.

Comparative Example 2

An organic-inorganic composite molded product was obtained in a manner similar to that in Example 1 except that when the (PMMA/inorganic fine particles) mixed material was formed, 5 g of the (inorganic fine particles/acetone) liquid having a concentration of 2.5 wt % was dripped.

Comparative Example 3

An organic-inorganic composite molded product was obtained in a manner similar to that in Example 1 except that only the PMMA resin was dissolved in acetone and the inorganic fine particles were not added.

Example 5

A PMMA resin (Delpet 70NH, manufactured by Asahi Kasei Chemicals Corporation) was mixed with acetone to have a concentration of 5 wt % and was dissolved therein at ordinary temperature by an ultrasonic treatment, so that a PMMA/acetone solution was prepared.

To 40 g of the PMMA/acetone solution, 5.6 g of RA200H was added, and an arbitrary amount of acetone was further added so that RA200H was immersed therein, followed by performing an ultrasonic treatment for sufficient mixing. After the acetone was spontaneously dried to some extent, the solvent was removed at approximately 210 degrees Celsius for approximately 4 hours in a vacuum furnace, so that a (PMMA/inorganic fine particles) mixed material was obtained.

Molding was performed in a manner similar to that in Example 1, so that an organic-inorganic composite molded product was obtained.

Example 6

An organic-inorganic composite molded product was obtained in a manner similar to that in Example 5 except that as the inorganic fine particles having an amino group, NA50H (silica, average primary particle diameter of 30 nm, manufactured by Nippon Aerosil Co., Ltd.) was used instead of RA200H, and that 1.2 g of NA50H was added to 10 g of the PMMA/acetone solution.

Comparative Example 4

An organic-inorganic composite molded product was obtained in a manner similar to that in Example 5 except that the inorganic fine particles were changed to R711 (silica, average primary particle diameter of 12 nm, manufactured by Nippon Aerosil Co., Ltd.), and that 1.8 g of R711 was added to 50 g of the PMMA/acetone solution. R711 is surface-modified with a methacryloxypropyl group.

Comparative Example 5

An organic-inorganic composite molded product was obtained in a manner similar to that in Example 1 except that the inorganic fine particles were changed to R805 (silica, average primary particle diameter of 12 nm, manufactured by Nippon Aerosil Co., Ltd). R805 is surface-modified with an octyl group.

Comparative Example 6

An organic-inorganic composite molded product was obtained in a manner similar to that in Comparative Example 5 except that when the (PMMA/inorganic fine particles) mixed material was formed, 10 g of the (inorganic fine particles/acetone) liquid having a concentration of 2.5 wt % was dripped.

Evaluation of Coefficient of Linear Expansion 1

By a TMA (TMA Q400, manufactured by TA Instrument Co., Ltd.), after three temperature cycles between 0 to 80 degrees Celsius were applied, the average coefficient of linear expansion in a thickness direction was computed between 20 to 60 degrees Celsius. An expansion probe was used for measurement of the displacement.

Evaluation of Content of Inorganic Fine Particles 1

The content of the inorganic fine particles indicates a value obtained by volume conversion of a residual weight percentage which is measured by increasing the temperature of the organic-inorganic composite molded product to 800 degrees Celsius using a thermogravimetric analysis (TGA) device. Measurement of the content of the inorganic fine particles was performed using a TGA (TGA Q500, manufactured by TA Instrument Co., Ltd.). When the content of the inorganic fine particles was converted from the percent by weight to vol % (percent by volume), 1.19 and 2.00 were used for the specific gravity of the PMMA and that of the inorganic fine particles, respectively. Each organic-inorganic composite molded product was cut into an appropriate size when the evaluation was performed.

The evaluation results of the organic-inorganic composite molded products of Examples and Comparative Examples are shown in Table 1. In addition, the relationship between the content of the inorganic fine particles and the coefficient of linear expansion of the organic-inorganic composite molded product obtained from Examples 1 to 4 and Comparative Examples 1 to 3 is shown in FIG. 1.

TABLE 1

| | MAIN SURFACE MODIFICATION GROUP | PARTICLE DIAMETER/ nm | CONTENT OF INORGANIC FINE PARTICLES/ vol % | COEFFICIENT OF LINER EXPANSION/ $10^{-6} \cdot °C.^{-1}$ | SIGN IN FIG. 1 |
|---|---|---|---|---|---|
| EXAMPLE 1 | AMINO | 12 | 56.8 | −187 | A |
| EXAMPLE 2 | AMINO | 12 | 38.2 | 6.4 | B |
| EXAMPLE 3 | AMINO | 12 | 38.1 | −86.4 | C |
| EXAMPLE 4 | AMINO | 12 | 33.6 | −40.5 | D |
| COMPARATIVE EXAMPLE 1 | AMINO | 12 | 26.8 | 48.2 | E |
| COMPARATIVE EXAMPLE 2 | AMINO | 12 | 12.2 | 63.7 | F |

TABLE 1-continued

|  | MAIN SURFACE MODIFICATION GROUP | PARTICLE DIAMETER/ nm | CONTENT OF INORGANIC FINE PARTICLES/ vol % | COEFFICIENT OF LINER EXPANSION/ $10^{-6} \cdot {}^\circ C.^{-1}$ | SIGN IN FIG. 1 |
|---|---|---|---|---|---|
| COMPARATIVE EXAMPLE 3 | NONE | NONE | 0 | 68.4 | G |
| EXAMPLE 5 | AMINO | 12 | 46.1 | −98.9 | |
| EXAMPLE 6 | AMINO | 30 | 58.3 | −170 | |
| COMPARATIVE EXAMPLE 4 | METHACRYLOXYPROPYL | 12 | 31.8 | 43.6 | |
| COMPARATIVE EXAMPLE 5 | OCTYL | 12 | 43.3 | 38.2 | |
| COMPARATIVE EXAMPLE 6 | OCTYL | 12 | 34.5 | 57.7 | |

Second Embodiment

Next, a second embodiment of the present invention will be described in detail.

An organic-inorganic composite material according to the present invention includes a poly(methyl methacrylate) and inorganic fine particles surface-modified with a functional group at least having a hexadecyl group, and the content of the inorganic fine particles is 30 to 80 vol %.

In the present invention, molding is performed after inorganic fine particles surface-modified with a functional group having a hexadecyl group is mixed with a poly(methyl methacrylate) (hereinafter referred to as PMMA) to have a high concentration, so that an organic-inorganic composite molded product having a significantly low coefficient of linear expansion is obtained.

Inorganic Fine Particles 2

As the inorganic fine particles of the present invention, inorganic fine particles surface-modified with a functional group having a hexadecyl group are used. Heretofore, although a method has been well known in which the coefficient of linear expansion of an organic resin material is decreased by addition of inorganic fine particles thereto, the decrease in coefficient of linear expansion was not satisfactory. The present inventors found out that the decrease in coefficient of linear expansion is changed dependent on the type of surface modification group of the inorganic fine particles. The reason for this is believed that the influence of the surface interaction effect between the organic resin material and the inorganic fine particles or among the inorganic fine particles and the dispersion state of the inorganic fine particles are changed depending on the type of surface modification group. Therefore, in order to significantly decrease the coefficient of linear expansion, the present inventors found out that it is important to select a functional group having a hexadecyl group as the surface modification group.

Although the inorganic fine particles are not particularly limited, for example, particles of metal oxides, such as silica, titania, zirconia, alumina, niobium oxide, magnesium oxide, beryllium oxide, tellurium oxide, yttrium oxide, and indium tin oxide, and metal particles, such as gold, platinum, and silver, may be mentioned. In particular, the inorganic fine particles are preferably silica fine particles.

Although the particle diameter of the inorganic fine particles is not particularly limited, if the particle diameter is too large, a low linear expansion property will be lost. The reason for this is believed that since the surface areas of the fine particles are decreased, the surface interaction effect is reduced. In addition, since optical scattering may occur if the particle diameter is large, the organic-inorganic composite material of the present invention may not be used for an optical system device. Since the rigidity of the fine particles is decreased if the particle diameter thereof is too small, a low linear expansion property may be lost in some cases. Hence, the average primary particle diameter of the inorganic fine particles is 1 to 40 nm and preferably 5 to 30 nm.

For example, commercial products, such as silica fine particles (R816, manufactured by Nippon Aerosil Co., Ltd.) may be used for the inorganic fine particles surface-modified with a functional group having a hexadecyl group.

Organic-Inorganic Composite Material

In a method for manufacturing an organic-inorganic composite material according to the present invention, after inorganic fine particles surface-modified with a functional group at least having a hexadecyl group and a poly(methyl methacrylate) dissolved in a solvent are mixed together so that the content of the inorganic fine particles is 30 to 80 vol % to the total of the inorganic fine particles and the poly(methyl methacrylate), the solvent is removed.

The mixing of the PMMA and the inorganic fine particles is performed by a method in which after the PMMA is dissolved in a solvent and then mixed with the inorganic fine particles, the solvent is removed. First, the PMMA is dissolved in a solvent to form a PMMA solution. As the solvent which dissolves the PMMA, for example, acetone, toluene, tetrahydrofuran, ethyl acetate, butyl acetate, xylene, and dimethylformamide may be mentioned. In addition, in order to finally remove the solvent, a solvent having a low boiling point, such as acetone, ethyl acetate, or tetrahydrofuran, is preferably used.

Subsequently, the inorganic fine particles and the PMMA solution are mixed together. The inorganic fine particles may be directly mixed with the PMMA solution, or a liquid in which the inorganic fine particles are mixed with a solvent beforehand may be mixed with the PMMA solution. Since the volume of the solvent is not particularly limited, the solvent may be additionally added, if needed, as long as it can be finally removed. After the PMMA solution and the inorganic fine particles are mixed together, a mixed liquid thus prepared is preferably homogenized by using a dispersing device, such as a homogenizer or an ultrasonic treatment.

Next, the solvent in the mixed liquid is removed. Since a residual solvent may adversely increase the coefficient of linear expansion, the volume of the residual solvent must be decreased as much as possible by heating and/or under reduced pressure. In particular, with respect to the total mass, the residual solvent is decreased to 2.5% or less and preferably to 1% or less.

As a mixing ratio of the PMMA and the inorganic fine particles, the content of the inorganic fine particles is 30 to 80 vol % (percent by volume) and preferably 30 to 50 vol % (percent by volume). In the present invention, if the content of the inorganic fine particles is 30 vol % or more, the coefficient of linear expansion of the organic-inorganic composite molded product is considerably decreased. In order to decrease the coefficient of linear expansion, although an increase of the content of the inorganic fine particles is effective, the organic-inorganic composite molded product becomes fragile and the moldability is degraded as the content is increased. Hence the content is preferably 80 vol % or less. In addition, even if the content of one organic-inorganic composite molded product is the same as that of the other one, depending on the dispersion state of the inorganic fine particles, the coefficient of linear expansion may be different from each other in some cases. The content of the inorganic fine particles of the present invention indicates a value obtained by volume conversion of a residual weight percentage which is measured by increasing the temperature of the organic-inorganic composite molded product to 800 degrees Celsius using a thermogravimetric analysis (TGA) device.

Organic-Inorganic Composite Molded Product 2

The organic-inorganic composite molded product according to the present invention is an organic-inorganic composite molded product formed by molding the above organic-inorganic composite material, and a coefficient of linear expansion of the organic-inorganic composite molded product in a range of 20 to 60 degrees Celsius is $20*10^{-6}$/degree Celsius or less (however, a negative coefficient of linear expansion is included). In addition, the coefficient of linear expansion of the organic-inorganic composite molded product of the present invention is preferably $-20*10^{-6}$ to $20*10^{-6}$/degree Celsius and more preferably $-10*10^{-6}$ to $10*10^{-6}$/degree Celsius. In this case, – indicates a negative coefficient of linear expansion. If the coefficient of linear expansion is higher than $20*10^{-6}$/degree Celsius, since the change in dimension of the organic-inorganic composite molded product caused by the change in temperature is increased, and a member may be unfavorably displaced in some cases.

A material formed by mixing inorganic fine particles and an organic resin can be molded by a known method, such as injection molding or heat press molding. In particular, the organic-inorganic composite material charged in a molding die can be molded into any shape by pressure application and heating at the glass transition temperature or more. When the temperature in molding is too low, a target shape cannot be transferred, and when the temperature is too high, the coefficient of linear expansion tends to be adversely increased; hence, the temperature is appropriately in a range of 150 to 300 degrees Celsius. Although the molding pressure is not particularly limited, in order to transfer the shape of the molding die, the pressure is preferably 50 MPa or more.

The organic-inorganic composite molded product of the present invention has a coefficient of linear expansion in a range of 20 to 60 degrees Celsius of $20*10^{-6}$/degree Celsius or less (however, a negative coefficient of linear expansion is included).

In addition, as the shape of the molded product, various forms, such as a sphere, a rod, a plate, a block, a tube, a spindle, a fiber, a grid, a film, and a sheet, can be molded and can be used as interior/exterior components used for various precision apparatuses and optical elements. In addition, since having a low coefficient of linear expansion in a range of 20 to 60 degrees Celsius, the organic-inorganic composite molded product according to the present invention can be used as a low-expansion member and a temperature compensating member, each of which is used for a precision optical device such as an optical fiber or a lens.

In addition, as in the first embodiment, the molded product may be used, for example, for an axisymmetric lens, such as an EF lens, shown in FIG. 4A which transmits light and which is used for a camera, video, or the like, a toric lens shown in FIG. 4B, or a reflective mirror which reflects light shown in FIG. 4C.

Examples

Example 7

A PMMA resin (Delpet 70NH, manufactured by Asahi Kasei Chemicals Corporation) was mixed with an acetone solvent to have a concentration of 5 wt % and was dissolved therein at ordinary temperature (25 degrees Celsius) by an ultrasonic treatment, so that a PMMA/acetone solution was prepared.

As the inorganic fine particles, silica fine particles (R816 surface-modified with a hexadecyl group, average primary particle diameter of 12 nm, manufactured by Nippon Aerosil Co., Ltd.) was mixed with acetone to have a concentration of 2.5 wt %, so that a (inorganic fine particles/acetone) liquid was prepared.

To 10 g of the PMMA/acetone solution thus prepared, 20 g of the (inorganic fine particles/acetone) liquid was dripped, and mixing was sufficiently performed using an ultrasonic treatment device. After the acetone in a mixed liquid was spontaneously dried to some extent, the solvent was removed at 250 degrees Celsius for 4 hours in a vacuum furnace, so that a (PMMA/inorganic fine particles) mixed material was obtained.

Molding was performed using a heat press method.

As a release agent, Novec-1720 (manufactured by Sumitomo 3M Limited) was dripped on a surface of a press molding die having a diameter of 15 mm and was then sufficiently wiped off. The (PMMA/inorganic fine particles) mixed material was charged in the press molding die, and while the die was set in a compact heat press machine (manufactured by As One Corporation), the temperature was increased to 250 degrees Celsius. After the temperatures of an upper surface and a lower surface of the compact heat press machine reached 250 degrees Celsius, a load of 110 MPa was applied and was spontaneously released while cooling by wind was performed to 100 degrees Celsius. The load was completely released at 100 degrees Celsius, and the (PMMA/inorganic fine particles) mixed material was recovered from the die, so that an organic-inorganic composite molded product having a coin shape was obtained.

Comparative Example 7

An organic-inorganic composite molded product was obtained in a manner similar to that in Example 7 except that after only the PMMA resin was dissolved in acetone without addition of the inorganic fine particles, the solvent removal was performed.

Comparative Example 8

An organic-inorganic composite molded product was obtained in a manner similar to that in Example 7 except that when the (PMMA/inorganic fine particles) mixed material was formed, the dripping amount of the (inorganic fine particles/acetone) liquid having a concentration of 2.5 wt % was changed from 20 g to 10 g to decreased the content of the inorganic fine particles.

Example 8

A PMMA resin was mixed with acetone to have a concentration of 5 wt % and was dissolved therein at ordinary temperature by an ultrasonic treatment, so that a PMMA/acetone solution was prepared.

To 40 g of the PMMA/acetone solution thus prepared, 4.0 g of R816 was added, and an arbitrary amount of acetone was added so that R816 was sufficiently immersed therein, followed by performing an ultrasonic treatment for sufficient mixing. After the acetone was spontaneously dried to some extent, the solvent was removed at approximately 250 degrees Celsius for approximately 4 hours in a vacuum furnace, so that a (PMMA/inorganic fine particles) mixed material was obtained.

Molding was performed in a manner similar to that in Example 7, so that an organic-inorganic composite molded product was obtained.

Example 9

An organic-inorganic composite molded product was obtained in a manner similar to that in Example 8 except that the addition amount of R816 was changed from 4.0 g to 4.5 g to increase the content of the inorganic fine particles.

Comparative Example 9

The silica fine particles used in Example 8 were changed to silica fine particles surface-modified with a methacryloxypropyl group (R711, average primary particle diameter of 12 nm, manufactured by Nippon Aerosil Co., Ltd.). An organic-inorganic composite molded product was obtained in a manner similar to that in Example 8 except that 1.8 g of R711 was added to 50 g of the PMMA/acetone solution.

Comparative Example 10

An organic-inorganic composite molded product was obtained in a manner similar to that in Example 7 except that the silica fine particles used in Example 7 were changed to silica fine particles surface-modified with an octyl group (R805, average primary particle diameter of 12 nm, manufactured by Nippon Aerosil Co., Ltd.), and that 10 g of the (inorganic fine particles/acetone) liquid was dripped.

Comparative Example 11

An organic-inorganic composite molded product was obtained in a manner similar to that in Comparative Example 10 except that when the (PMMA/inorganic fine particles) mixed material was formed, the dripping amount of the (inorganic fine particles/acetone) liquid having a concentration of 2.5 wt % was changed from 10 g to 20 g to increase the content of the inorganic fine particles.

Example 10

An organic-inorganic composite molded product was obtained in a manner similar to that in Example 8 except that ethyl acetate was used instead of acetone, and that 0.8 g of R816 was added to 10 g of a PMMA/ethyl acetate solution having a concentration of 5 wt %.

Example 11

An organic-inorganic composite molded product was obtained in a manner similar to that in Example 8 except that tetrahydrofuran was used instead of acetone, and that 0.6 g of R816 was added to 6 g of a PMMA/tetrahydrofuran solution having a concentration of 5 wt %.

Evaluation of Coefficient of Linear Expansion 2

By a TMA (TMA Q400, manufactured by TA Instrument Co., Ltd.), after three temperature cycles between 0 to 80 degrees Celsius were applied, the coefficient of linear expansion in a thickness direction was computed between 20 to 60 degrees Celsius. An expansion probe was used for measurement of the displacement.

Evaluation of Content of Inorganic Fine Particles 2

The content of the inorganic fine particles indicates a value obtained by volume conversion of a residual weight percentage which is measured by increasing the temperature of the organic-inorganic composite molded product to 800 degrees Celsius using a thermogravimetric analysis (TGA) device. Measurement of the content of the inorganic fine particles was performed using a TGA (TGA Q500, manufactured by TA Instrument Co., Ltd.). When the content of the inorganic fine particles was converted from the percent by weight (wt %) to percent by volume (vol %), 1.19 and 2.00 were used for the specific gravity of the PMMA and that of the silica fine particles, respectively. Each organic-inorganic composite molded product was cut into an appropriate size when the evaluation was performed.

The evaluation results of the organic-inorganic composite molded products of Examples and Comparative Example are shown in Table 2. In addition, the relationship between the content of the inorganic fine particles and the coefficient of linear expansion of the organic-inorganic composite molded product obtained from Examples 7 to 9 and Comparative Examples 7 and 8 is shown in FIG. 2.

TABLE 2

Figure 2:
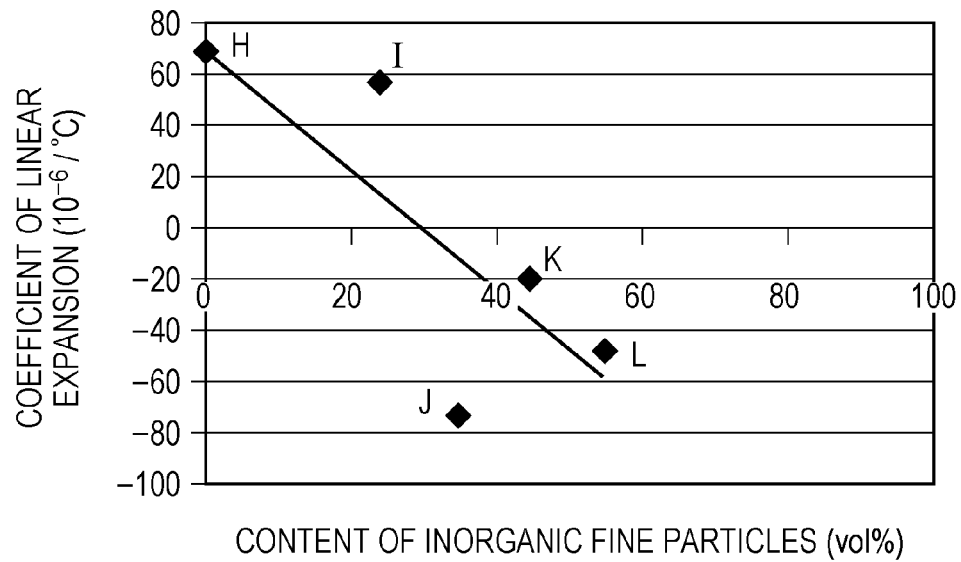
FIG. 2 is a graph showing the relationship between the content of inorganic fine particles and the coefficient of linear expansion of an organic-inorganic composite molded product obtained in a second embodiment.

|  | MAIN SURFACE MODIFICATION GROUP | PARTICLE DIAMETER/ nm | SOLVENT | CONTENT OF INORGANIC FINE PARTICLES/ vol % | COEFFICIENT OF LINER EXPANSION/ $10^{-6} \cdot °C.^{-1}$ | SIGN IN FIG. 2 |
|---|---|---|---|---|---|---|
| COMPARATIVE EXAMPLE 7 | NONE | NONE | ACETONE | 0 | 68.4 | H |
| COMPARATIVE EXAMPLE 8 | HEXADECYL | 12 | ACETONE | 23.9 | 56.5 | I |
| EXAMPLE 7 | HEXADECYL | 12 | ACETONE | 34.5 | −73.2 | J |
| EXAMPLE 8 | HEXADECYL | 12 | ACETONE | 44.3 | −19 | K |
| EXAMPLE 9 | HEXADECYL | 12 | ACETONE | 54.3 | −48.4 | L |
| COMPARATIVE EXAMPLE 9 | METHACRYLOXYPROPYL | 12 | ACETONE | 31.8 | 43.6 |  |
| COMPARATIVE EXAMPLE 10 | OCTYL | 12 | ACETONE | 34.5 | 57.7 |  |
| COMPARATIVE | OCTYL | 12 | ACETONE | 43.3 | 38.2 |  |

TABLE 2-continued

|  | MAIN SURFACE MODIFICATION GROUP | PARTICLE DIAMETER/ nm | SOLVENT | CONTENT OF INORGANIC FINE PARTICLES/ vol % | COEFFICIENT OF LINER EXPANSION/ $10^{-6} \cdot °C.^{-1}$ | SIGN IN FIG. 2 |
|---|---|---|---|---|---|---|
| EXAMPLE 11 |  |  |  |  |  |  |
| EXAMPLE 10 | HEXADECYL | 12 | ETHYL ACETATE | 50.5 | −18.7 |  |
| EXAMPLE 11 | HEXADECYL | 12 | TETRAHYDROFURAN | 42.8 | 1.4 |  |

According to Table 2, it is found that when the inorganic fine particles are surface-modified with a hexadecyl group, and the content of the inorganic fine particles of the organic-inorganic composite molded product is 30 vol % or more, the coefficient of linear expansion is decreased to $20*10^{-6}$/degree Celsius or less.

Third Embodiment

Next, a third embodiment of the present invention will be described in detail.

An organic-inorganic composite material according to the present invention includes a poly(methyl methacrylate) and inorganic fine particles having hydrophilic surfaces and an average primary particle diameter of 1 to 15 nm, and the content of the inorganic fine particles is 35 to 80 vol %.

Inorganic Fine Particles 3

The present invention provides an organic-inorganic composite molded product having a significantly low coefficient of linear expansion obtained in such a way that inorganic fine particles which are not surface-modified are mixed with a poly(methyl methacrylate) (hereinafter referred to as "PMMA") to have a high concentration, followed by performing removal of the solvent and molding.

As the inorganic fine particles of the present invention, common inorganic fine particles which are not artificially processed by a surface treatment and which have hydrophilic surfaces are used. In general, since hydroxyl groups are present on the surface of an inorganic material, the hydrophilic property is exhibited unless a surface treatment is artificially performed. Heretofore, when inorganic fine particles are mixed in an organic resin material, in order to improve the dispersibility, the inorganic fine particles are generally processed by a surface treatment. However, in order to significantly decrease the coefficient of linear expansion, the inorganic fine particles of the present invention are not processed by a surface treatment and have hydrophilic surfaces.

Although the inorganic fine particles used in the present invention are not particularly limited, for example, there may be used metal oxide fine particles, such as silica, titania, zirconia, alumina, niobium oxide, magnesium oxide, beryllium oxide, tellurium oxide, yttrium oxide, cerium oxide, and indium tin oxide, and metal particles, such as gold, platinum, and silver.

Although the particle diameter of the inorganic fine particles used in the present invention is not particularly limited, if the particle diameter is too large, a low linear expansion property will be lost. The reason for this is believed that since the surface areas of the fine particles are decreased, the surface interaction effect is reduced. In addition, since optical scattering may occur if the particle diameter is large, the organic-inorganic composite material of the present invention may not be used for an optical system device. Since the rigidity of the fine particles is decreased if the particle diameter thereof is too small, a low linear expansion property may be lost in some cases. Hence, the average primary particle diameter of the inorganic fine particles used in the present invention is 1 to 15 nm and preferably 5 to 14 nm.

For example, commercial products, such as Aerosil (trade name, manufactured by Nippon Aerosil Co., Ltd.), NanoTek (trade name, manufactured by CIK NanoTek Corp.), and TECNAN Nano Powder (manufactured by TECNAN Ltd.) may be used for the inorganic fine particles used in the present invention.

In a method for manufacturing an organic-inorganic composite material according to the present invention, after inorganic fine particles having hydrophilic surfaces and an average primary particle diameter of 1 to 15 nm and a poly(methyl methacrylate) dissolved in a solvent are mixed together so that the content of the inorganic fine particles is 35 to 80 vol % to the total of the inorganic fine particles and the poly (methyl methacrylate), the solvent is removed.

The mixing of the PMMA and the inorganic fine particles is performed by a method in which after the PMMA is dissolved in a solvent and then mixed with the inorganic fine particles, the solvent is removed. First, the PMMA is dissolved in a solvent to form a PMMA solution. As the solvent which dissolves the PMMA, for example, acetone, toluene, tetrahydrofuran, ethyl acetate, butyl acetate, xylene, and dimethylformamide may be mentioned. In addition, in order to finally remove the solvent, a solvent having a low boiling point, such as acetone, ethyl acetate, or tetrahydrofuran, is preferably used.

Subsequently, the inorganic fine particles and the PMMA solution are mixed together. The inorganic fine particles may be directly mixed with the PMMA solution, or a liquid in which the inorganic fine particles are mixed with a solvent beforehand may be mixed with the PMMA solution. Since the volume of the solvent is not particularly limited, the solvent may be additionally added, if needed, as long as it can be finally removed. After the PMMA solution and the inorganic fine particles are mixed together, a mixed liquid thus obtained is preferably homogenized by a dispersing device, such as a homogenizer or an ultrasonic treatment.

Next, the solvent in the mixed liquid is removed. Since a residual solvent may adversely increase the coefficient of linear expansion, the volume of the residual solvent must be decreased as much as possible by heating and/or under reduced pressure. In particular, with respect to the total mass, the residual solvent is decreased to 2.5% or less and preferably to 1% or less.

As a mixing ratio of the PMMA and the inorganic fine particles, the content of the inorganic fine particles is 35 to 80 vol % (percent by volume) and preferably 35 to 50 vol % (percent by volume). In the present invention, if the content of the inorganic fine particles is 35 vol % or more, the coefficient of linear expansion of the organic-inorganic composite molded product is considerably decreased. In order to decrease the coefficient of linear expansion, although an increase of the content of the inorganic fine particles is effective, the organic-inorganic composite molded product becomes fragile and the moldability is degraded as the content is increased. Hence, the content is preferably 80 vol % or less. In addition, even if the content of one organic-inorganic composite molded product is the same as that of the other one, depending on the dispersion state of the inorganic fine particles, the coefficient of linear expansion may be different from each other in some cases. The content of the inorganic fine particles of the present invention indicates a value obtained by volume conversion of a residual weight percentage which is measured by increasing the temperature of the organic-inorganic composite molded product to 800 degrees Celsius using a thermogravimetric analysis (TGA) device.
Organic-Inorganic Composite Molded Product 3

The organic-inorganic composite molded product according to the present invention is an organic-inorganic composite molded product formed by molding the above organic-inorganic composite material, and a coefficient of linear expansion of the organic-inorganic composite molded product in a range of 20 to 60 degrees Celsius is $20*10^{-6}$/degree Celsius or less (however, a negative coefficient of linear expansion is included).

The organic-inorganic composite material formed by mixing the PMMA and the inorganic fine particles can be molded into any shape by pressure application and heating using injection molding or heat press molding. When the temperature in molding is too low, a target shape cannot be formed, and when the temperature is too high, the coefficient of linear expansion tends to be adversely increased; hence, the temperature is appropriately in a range of 150 to 300 degrees Celsius. Although the molding pressure is not particularly limited, in order to transfer the shape, the pressure is preferably 50 MPa or more.

The organic-inorganic composite molded product of the present invention has a coefficient of linear expansion in a range of 20 to 60 degrees Celsius of $20*10^{-6}$/degree Celsius or less (however, a negative coefficient of linear expansion is included). The coefficient of linear expansion of the organic-inorganic composite molded product of the present invention is preferably $-20*10^{-6}$ to $20*10^{-6}$/degree Celsius and more preferably $-10*10^{-6}$ to $10*10^{-6}$/degree Celsius. In this case, – indicates a negative coefficient of linear expansion. If the coefficient of linear expansion is more than $20*10^{-6}$/degree Celsius, since the change in dimension of the organic-inorganic composite molded product caused by the change in temperature is increased, a member may be unfavorably displaced in some cases.

Example 12

A PMMA resin (Delpet 70NH, manufactured by Asahi Kasei Chemicals Corporation) was mixed with an acetone solvent to have a concentration of 5 wt % and was dissolved therein at ordinary temperature (25 degrees Celsius) by an ultrasonic treatment, so that a PMMA/acetone solution was prepared.

After 1.0 g of silica fine particles without surface modification (Aerosil 300, average primary particle diameter of 7 nm, manufactured by Nippon Aerosil Co., Ltd.) was added to 10 g of the PMMA/acetone solution, an arbitrary volume of acetone was then added so that the Aerosil 300 was sufficiently immersed therein, and mixing was sufficiently performed by an ultrasonic treatment.

After the acetone was spontaneously dried to some extent, the solvent was removed at approximately 250 degrees Celsius for approximately 4 hours in a vacuum furnace, so that a (PMMA/inorganic fine particles) mixed material was obtained.

Molding was performed using a heat press method.

As a release agent, Novec-1720 (manufactured by Sumitomo 3M Limited) was dripped on a surface of a press molding die having a diameter of 15 mm and was then sufficiently wiped off. The (PMMA/inorganic fine particles) mixed material was charged in the press molding die, and while the die was set in a compact heat press machine (manufactured by As One Corporation), the temperature was increased to 250 degrees Celsius. After the temperatures of an upper surface and a lower surface of the compact heat press machine reached 250 degrees Celsius, a load of 110 MPa was applied and was spontaneously released while cooling by wind was performed to 100 degrees Celsius. The load was completely released at 100 degrees Celsius, and the (PMMA/inorganic fine particles) mixed material was recovered from the die, so that an organic-inorganic composite molded product having a coin shape was obtained.

Example 13

A PMMA resin (Delpet 70NH, manufactured by Asahi Kasei Chemicals Corporation) was mixed with an acetone solvent to have a concentration of 5 wt % and was dissolved therein at ordinary temperature by an ultrasonic treatment, so that a PMMA/acetone solution was prepared.

Next, Aerosil 300 was mixed with acetone to have a concentration of 2.5 wt %, so that a (inorganic fine particles/acetone) liquid was prepared.

To 10 g of the PMMA/acetone solution thus prepared, 20 g of the (inorganic fine particles/acetone) liquid was dripped, and mixing was sufficiently performed using an ultrasonic treatment device. After the acetone in a mixed liquid was spontaneously dried to some extent, the solvent was removed at 250 degrees Celsius for 4 hours in a vacuum furnace, so that a (PMMA/inorganic fine particles) mixed material was obtained.

Molding was performed in a manner similar to that in Example 12, so that an organic-inorganic composite molded product was obtained.

Comparative Example 12

An organic-inorganic composite molded product was obtained in a manner similar to that in Example 13 except that after only the PMMA was dissolved in acetone without addition of the inorganic fine particles, the solvent removal was performed.

Comparative Example 13

An organic-inorganic composite molded product was obtained in a manner similar to that in Example 13 except that when the (PMMA/inorganic fine particles) mixed material was formed, the dripping amount of the (inorganic fine particles/acetone) liquid having a concentration of 2.5 wt % was changed from 20 g to 10 g to decreased the content of the inorganic fine particles.

Example 14

In Example 12, the silica fine particles were changed from Aerosil 300 to Aerosil 200 (average primary particle diameter of 12 nm, manufactured by Nippon Aerosil Co., Ltd.) having a large particle diameter. An organic-inorganic composite molded product was obtained in a manner similar to that in Example 1 except that 0.5 g of Aerosil 200 was added to 10 g of the PMMA/acetone solution having a concentration of 5 wt %, and that acetone was sufficiently added and mixed thereto.

Example 15

An organic-inorganic composite molded product was obtained in a manner similar to that in Example 14 except that the addition amount of Aerosil 200 was changed from 0.5 to 0.7 g to increase the content of the inorganic fine particles.

Example 16

An organic-inorganic composite molded product was obtained in a manner similar to that in Example 14 except that the addition amount of Aerosil 200 was changed from 0.5 to 1.0 g to increase the content of the inorganic fine particles.

Example 17

An organic-inorganic composite molded product was obtained in a manner similar to that in Example 14 except that the addition amount of Aerosil 200 was changed from 0.5 to 1.4 g to increase the content of the inorganic fine particles.

Comparative Example 14

An organic-inorganic composite molded product was obtained in a manner similar to that in Example 14 except that in the material mixing in Example 14, after 0.63 g of silica fine particles 90G (manufactured by Nippon Aerosil Co., Ltd.) having an average primary particle diameter of 20 nm was directly added to 7.4 g of the PMMA/acetone solution having a concentration of 5 wt %, acetone was sufficiently added and mixed thereto.

Comparative Example 15

An organic-inorganic composite molded product was obtained in a manner similar to that in Example 14 except that in the material mixing in Example 14, after 0.63 g of silica fine particles 50 (manufactured by Nippon Aerosil Co., Ltd.) having an average primary particle diameter of 30 nm was directly added to 7.4 g of the PMMA/acetone solution having a concentration of 5 wt %, acetone was sufficiently added and mixed thereto.

Comparative Example 16

An organic-inorganic composite molded product was obtained in a manner similar to that in Example 14 except that after 0.5 g of silica fine particles OX50 (manufactured by Nippon Aerosil Co., Ltd.) having an average primary particle diameter of 40 nm was directly added to 10 g of the PMMA/acetone solution having a concentration of 5 wt %, acetone was sufficiently added and mixed thereto.

Comparative Example 17

An organic-inorganic composite molded product was obtained in a manner similar to that in Comparative Example 16 except that the addition amount of OX50 was changed to 1.0 g.

Comparative Example 18

An organic-inorganic composite molded product was obtained in a manner similar to that in Comparative Example 16 except that the addition amount of OX50 was changed to 1.4 g.

Comparative Example 19

The silica fine particles used in Example 1 were changed to silica fine particles surface-modified with a methacryloxypropyl group (R711, average primary particle diameter of 12 nm, manufactured by Nippon Aerosil Co., Ltd.). An organic-inorganic composite molded product was obtained in a manner similar to that in Example 1 except that 1.8 g of R711 was added to 50 g of the PMMA/acetone solution.

Comparative Example 20

The silica fine particles used in Example 1 were changed to silica fine particles surface-modified with an octyl group (R805, average primary particle diameter of 12 nm, manufactured by Nippon Aerosil Co., Ltd.). An organic-inorganic composite molded product was obtained in a manner similar to that in Example 1 except that 10 g of the (inorganic fine particles/acetone) liquid was dripped.

Comparative Example 21

An organic-inorganic composite molded product was obtained in a manner similar to that in Comparative Example 20 except that when the (PMMA/inorganic fine particles) mixed material was formed, the dripping amount of the (inorganic fine particles/acetone) liquid having a concentration of 2.5 wt % was changed from 10 g to 20 g to increase the content of the inorganic fine particles.

Example 18

An organic-inorganic composite molded product was obtained in a manner similar to that in Example 1 except that ethyl acetate was used instead of acetone, and that 2.0 g of Aerosil 300 was added to 20 g of a PMMA/ethyl acetate solution having a concentration of 5 wt %.

Example 19

An organic-inorganic composite molded product was obtained in a manner similar to that in Example 1 except that tetrahydrofuran was used instead of acetone, and that 1.0 g of Aerosil 200 was added to 10 g of a PMMA/tetrahydrofuran solution having a concentration of 5 wt %.

Example 20

An organic-inorganic composite molded product was obtained in a manner similar to that in Example 14 except that 3.5 g of cerium oxide fine particles (NanoTek, average primary particle diameter of 14 nm, manufactured by CIK NanoTek, Corp.) was added instead of the silica fine particles.

Evaluation of Coefficient of Linear Expansion 3

By a TMA (TMA Q400, manufactured by TA Instrument Co., Ltd.), after three temperature cycles between 0 to 80 degrees Celsius were applied, the coefficient of linear expansion in a thickness direction was computed between 20 to 60 degrees Celsius and was defined as the coefficient of linear expansion of the present invention. An expansion probe was used for measurement of the displacement.

Evaluation of Content of Inorganic Fine Particles 3

The content of the inorganic fine particles indicates a value obtained by volume conversion of a residual weight percentage which is measured by increasing the temperature of the organic-inorganic composite molded product to 800 degrees Celsius using a thermogravimetric analysis (TGA) device.

Measurement of the content of the inorganic fine particles was performed using a TGA (TGA Q500, manufactured by TA Instrument Co., Ltd.). When the content of the inorganic fine particles was converted from the percent by weight (wt %) to the percent by volume (vol %), 1.19, 2.00, and 7.00 were used for the specific gravities of the PMMA, the silica fine particles, and the cerium oxide fine particles, respectively. Each organic-inorganic composite molded product was cut into an appropriate size when the evaluation was performed.

Figure 3:
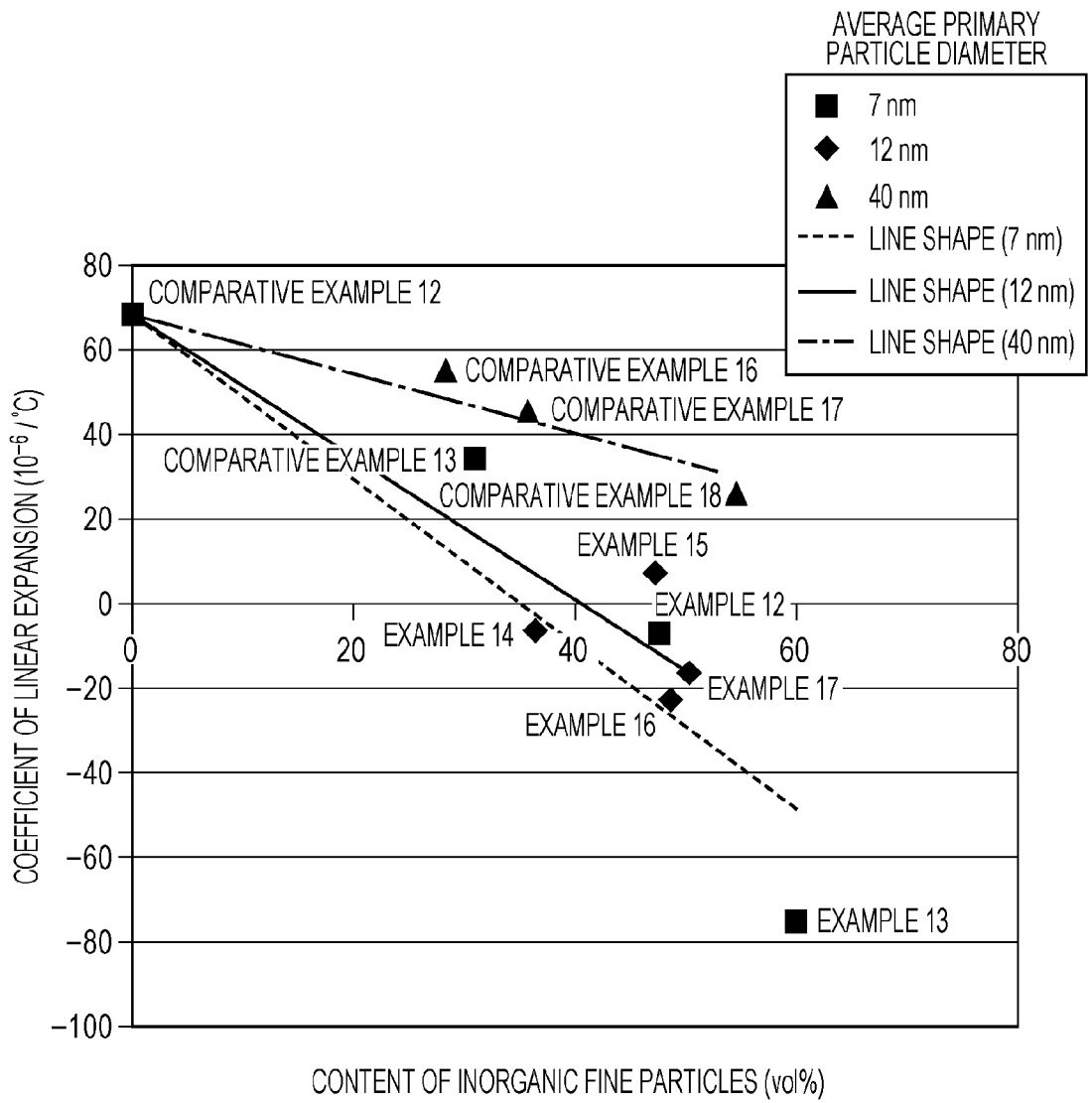
FIG. 3 is a graph showing the relationship between the content of inorganic fine particles and the coefficient of linear expansion of an organic-inorganic composite molded product obtained in a third embodiment.

The evaluation results of the organic-inorganic composite molded products of Examples and Comparative Example are shown in Table 3. In addition, the relationship between the content of the inorganic fine particles and the coefficient of linear expansion of the organic-inorganic composite molded product obtained from some of Examples and Comparative Examples is shown in FIG. 3.

This application Claims the benefit of Japanese Patent Application Nos. 2011-133498, filed Jun. 15, 2011, No. 2011-133499, filed Jun. 15, 2011, and No. 2011-133500, filed Jun. 15, 2011, which are hereby incorporated by reference herein in their entirety.

The invention claimed is:

1. An organic-inorganic composite molded product comprising:
    inorganic fine particles having hydrophilic surfaces, which are surface-modified with a functional group at least having an amino group; and
    a poly(methyl methacrylate),

TABLE 3

| | MAIN SURFACE MODIFICATION GROUP | PARTICLE DIAMETER (nm) | INORGANIC FINE PARTICLES | SOLVENT | CONTENT OF INORGANIC FINE PARTICLES (vol %) | COEFFICIENT OF LINEAR EXPANSION ($10^{-6}/°$ C.) |
|---|---|---|---|---|---|---|
| COMPARATIVE EXAMPLE 12 | NONE | NONE | SILICA | ACETONE | 0 | 68.4 |
| COMPARATIVE EXAMPLE 13 | NO SURFACE MODIFICATION | 7 | SILICA | ACETONE | 31.2 | 34.6 |
| EXAMPLE 12 | NO SURFACE MODIFICATION | 7 | SILICA | ACETONE | 47.6 | −7 |
| EXAMPLE 13 | NO SURFACE MODIFICATION | 7 | SILICA | ACETONE | 60.1 | −75.3 |
| EXAMPLE 14 | NO SURFACE MODIFICATION | 12 | SILICA | ACETONE | 36.5 | −6 |
| EXAMPLE 15 | NO SURFACE MODIFICATION | 12 | SILICA | ACETONE | 47.2 | 8 |
| EXAMPLE 16 | NO SURFACE MODIFICATION | 12 | SILICA | ACETONE | 48.7 | −22 |
| EXAMPLE 17 | NO SURFACE MODIFICATION | 12 | SILICA | ACETONE | 50.3 | −16 |
| COMPARATIVE EXAMPLE 14 | NO SURFACE MODIFICATION | 20 | SILICA | ACETONE | 47.9 | 31.8 |
| COMPARATIVE EXAMPLE 15 | NO SURFACE MODIFICATION | 30 | SILICA | ACETONE | 49.6 | 30.8 |
| COMPARATIVE EXAMPLE 16 | NO SURFACE MODIFICATION | 40 | SILICA | ACETONE | 28.4 | 55.5 |
| COMPARATIVE EXAMPLE 17 | NO SURFACE MODIFICATION | 40 | SILICA | ACETONE | 35.8 | 45.7 |
| COMPARATIVE EXAMPLE 18 | NO SURFACE MODIFICATION | 40 | SILICA | ACETONE | 54.6 | 26.1 |
| COMPARATIVE EXAMPLE 19 | METHACRYLOXYPROPYL | 12 | SILICA | ACETONE | 31.8 | 43.6 |
| COMPARATIVE EXAMPLE 20 | OCTYL | 12 | SILICA | ACETONE | 34.5 | 57.7 |
| COMPARATIVE EXAMPLE 21 | OCTYL | 12 | SILICA | ACETONE | 43.3 | 38.2 |
| EXAMPLE 18 | NO SURFACE MODIFICATION | 7 | SILICA | ETHYL ACETATE | 61.5 | −12.4 |
| EXAMPLE 19 | NO SURFACE MODIFICATION | 12 | SILICA | TETRAHYDROFURAN | 44.8 | −2.6 |
| EXAMPLE 20 | NO SURFACE MODIFICATION | 14 | CERIUM OXIDE | ACETONE | 59.7 | −16.6 |

(Note 1)
The particle diameter indicates the average primary particle diameter (nm).

According to Table 3, it is found that when the content of the inorganic fine particles which have an average primary particle diameter of 15 nm or less and which are not surface-modified is 35 vol % or more, the coefficient of linear expansion of the organic-inorganic composite molded product is decreased to $20*10^{-6}$/degree Celsius or less.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

wherein the molded product has a coefficient of linear expansion in a range of 20 to 60 degrees Celsius of $20*10^{-6}$ to $-80*10^{-6}$/degree Celsius; and
wherein the average primary particle diameter of the inorganic fine particles is 1 to 15 nm, and the content of the inorganic fine particles is 35 to 80 vol %.

2. The organic-inorganic composite molded product according to claim 1, wherein the inorganic fine particles include silica fine particles.

3. A method for manufacturing an organic-inorganic composite molded product comprising:
    preparing inorganic fine particles having hydrophilic surfaces, which are surface-modified with a functional group at least having an amino group and which have an average primary particle diameter of 1 to 15 nm; dissolving a poly(methyl methacrylate) in a solvent;

mixing the inorganic fine particles with the poly(methyl methacrylate) dissolved in the solvent to form a mixed material; and performing pressure molding of the mixed material under heating condition, wherein the molded product has a coefficient of linear expansion in a range of 20 to 60 degrees Celsius of $20*10^{-6}$ to $-80*10^{-6}$/degree Celsius; and wherein the content of the inorganic fine particles after the pressure molding is 35 to 80 vol %.

4. The method for manufacturing an organic-inorganic composite molded product according to claim 3, wherein the inorganic fine particles include silica fine particles, and the solvent includes at least one of acetone, tetrahydrofuran, and ethyl acetate.

5. An organic-inorganic composite molded product comprising:
inorganic fine particles having hydrophilic surfaces; and
a poly(methyl methacrylate),
wherein the molded product has a coefficient of linear expansion in a range of 20 to 60 degrees Celsius of $20*10^{-6}$ to $-80*10^{-6}$/degree Celsius; and
wherein the average primary particle diameter of the inorganic fine particles is 1 to 15 nm, and the content of the inorganic fine particles is 35 to 80 vol %.

6. The organic-inorganic composite molded product according to claim 5, wherein the inorganic fine particles include silica fine particles or cerium oxide fine particles.

7. A method for manufacturing an organic-inorganic composite molded product comprising:

preparing inorganic fine particles which have hydrophilic surfaces and an average primary particle diameter of 1 to 15 nm;

dissolving a poly(methyl methacrylate) in a solvent;

mixing the inorganic fine particles with the poly(methyl methacrylate) dissolved in the solvent to form a mixed material; and performing pressure molding of the mixed material under heating condition, wherein the molded product has a coefficient of linear expansion in a range of 20 to 60 degrees Celsius of $20*10^{-6}$ to $-80*10^{-6}$/degree Celsius; and wherein the content of the inorganic fine particles after the pressure molding is 35 to 80 vol %.

8. The method for manufacturing an organic-inorganic composite molded product according to claim 7, wherein the inorganic fine particles include silica fine particles or cerium oxide fine particles, and the solvent includes at least one of acetone, tetrahydrofuran, and ethyl acetate.

9. The organic-inorganic composite molded product according to claim 5, wherein the inorganic fine particles include silica fine particles.

10. The organic-inorganic composite molded product according to claim 5, wherein the inorganic fine particles include cerium oxide fine particles.

11. The organic-inorganic composite molded product according to claim 5, wherein the inorganic fine particles include silica fine particles.

12. The organic-inorganic composite molded product according to claim 5, wherein the inorganic fine particles include cerium oxide fine particles.

* * * * *